US005447093A

United States Patent [19]

Budzich

[11] Patent Number: 5,447,093

[45] Date of Patent: Sep. 5, 1995

[54] FLOW FORCE COMPENSATION

[75] Inventor: Tadeusz Budzich, deceased, late of Moreland Hills, Ohio, by Euphemia A. M. Budzich, executrix

[73] Assignee: Caterpillar Inc., Peoria, Ill.

[21] Appl. No.: 39,665

[22] Filed: Mar. 30, 1993

[51] Int. Cl.$^{6}$ .............................................. F16D 31/02

[52] U.S. Cl. ...................................... 91/446; 91/448; 91/468

[58] Field of Search ................. 91/446, 448, 468, 518, 91/532, 432, 451, 452

[56] References Cited

U.S. PATENT DOCUMENTS

| | | | |
|---|---|---|---|
| 3,777,773 | 12/1973 | Tolbert | 91/451 X |
| 3,982,469 | 9/1976 | Bianchetta | 91/518 |
| 4,180,098 | 12/1979 | Budzich | 91/446 X |
| 4,282,898 | 8/1981 | Harmon et al. | 91/451 X |
| 5,062,350 | 11/1991 | Tanaka et al. | 91/446 X |
| 5,083,430 | 1/1992 | Hirata et al. | 91/448 X |
| 5,150,574 | 9/1992 | Hirata et al. | 91/446 X |
| 5,285,642 | 2/1994 | Watanabe et al. | 91/446 X |
| 5,333,449 | 8/1994 | Takahashi et al. | 91/446 X |

*Primary Examiner*—John E. Ryznic

*Attorney, Agent, or Firm*—J. W. Burrows

[57] ABSTRACT

In load sensing systems, pressure compensating valves are normally used to maintain a predetermined pressure differential across the orifices in the directional control valve at a predetermined level. The predetermined pressure level acting across the directional control valve can be adversely affected by flow forces acting on a valving element of the pressure compensating valve. In the subject invention, flow force compensation is provided by having a forced balancing device connected to a pressure compensated valve device so that a force that is directly proportional to the degree of flow forces acting on the pressure compensating valve device is transferred to a valving element thereof in opposition to the flow forces that are acting on the valving element. The subject arrangement is also applicable to providing flow force compensation for negative load pressure compensating valve devices. By having flow force compensation that is directly responsive to a predetermined differential pressure across a directional control valve, the predetermined pressure differential thereacross can be more precisely maintained regardless of varying load conditions in the fluid system.

8 Claims, 2 Drawing Sheets

FLOW FORCE COMPENSATION

TECHNICAL FIELD

This invention relates generally to a pressure compensated flow controlled fluid system, and more particularly to controlling the flow forces acting on pressure compensated valves in the system.

BACKGROUND ART

It is well known in the hydraulic art to have a fluid system wherein the delivery flow rate of the pump is controlled so as to provide the needed flow to an actuator at a pressure higher by a fixed value than the pressure required to move the load. This type of system is typically called a load sensing system. Likewise, it is well-known to provide a pressure compensating valve in each pressure line that supplies fluid to respective directional control valves in order to maintain a predetermined differential pressure across an orifice in the directional control valve regardless of variations in the load. By maintaining a predetermined differential pressure across the orifice of the directional control valve, the volume of fluid passing therethrough remains constant for a given orifice size irrespective of changing load conditions. This type of pressure compensating valve is normally referred to as a positive load pressure compensating valve. The term "positive load" refers to a system wherein the load is a resisting type of load. It is also well known to use a negative load pressure compensating valve in the exhaust flow line to control the rate of fluid flow across the directional control valve during conditions in which the load is an aiding type load. In an aiding type load, the load is attempting to exhaust the fluid from the actuator faster than the fluid is being introduced thereto. This operating condition is referred to as a "negative load".

The different types of pressure compensating valves noted above have a valving element therein which serves as a variable restriction in order to control the fluid flow thereacross to maintain the constant differential pressure across the orifice in the directional control valve. It is well known that as the pressure drop across the valving element increases, a force, normally referred to as a flow force, is created which acts on the valving element adversely affecting its operation. In most cases involving pressure compensating valves, this unwanted force acts to prematurely cause the valving element to further restrict the flow thereacross. This unwanted restriction results in the differential pressure across the directional control valve being changed. Normally this change is in the direction of reducing the desired differential pressure. U.S. Pat. No. 5,150,574 dated Sep. 29, 1992 by Toichi Hirata et al. attempts to overcome this problem by providing a counteracting force to the pressure compensating valve that is established by a relationship between the pressures upstream and downstream thereof. This arrangement appears to at least partially offset the flow forces, but due to the pressure acting on cross-sectional areas that are unequal in size, the resulting counteracting force is not directly proportional to the varying difference in the pressure drop across the pressure compensating valve. Furthermore, this counteracting force is, at least in part, always responsive to the highest system pressure. Consequently, its affect on any other circuit in the system that is being loaded at a lesser amount would be receiving a counteracting force to the valving element of the pressure compensating valve that is not typical for that particular circuit.

The present invention is directed to overcoming one or more of the problems as set forth above.

DISCLOSURE OF THE INVENTION

In one aspect of the present invention, a flow force compensating means is provided for use in a fluid system having a source of pressurized fluid connected to a reservoir, an actuator driven by fluid from the source of pressurized fluid, a directional control valve having variable orifice means disposed therein, and pressure compensating valve means having valving element means with throttling orifices and being operative to control a differential pressure across the variable orifice means of the directional control valve at a substantially constant rate. The flow force compensating means includes force balancing means responsive to the differential pressure across the variable orifice means of the directional control valve for generating and transmitting a balancing force to the valving element of the pressure compensating valve means to offset the flow forces acting on the valving element of the pressure compensating valve means.

The present invention provides a flow force compensating means that provides a balancing force to the compensating valve means that is directly related to the desired differential pressure established across the directional control valve. Consequently, by providing a balancing force that is directly related to the differential pressure across the directional control valve, the flow forces that are generated as an effect of the flow across the pressure compensating valve are substantially eliminated. Therefore, the desired pressure differential across the directional control valve is maintained, thus allowing, if desired, the opportunity to maintain a lower pressure differential across the main control valve.

BEST MODE FOR CARRYING OUT THE INVENTION

Figure 1:
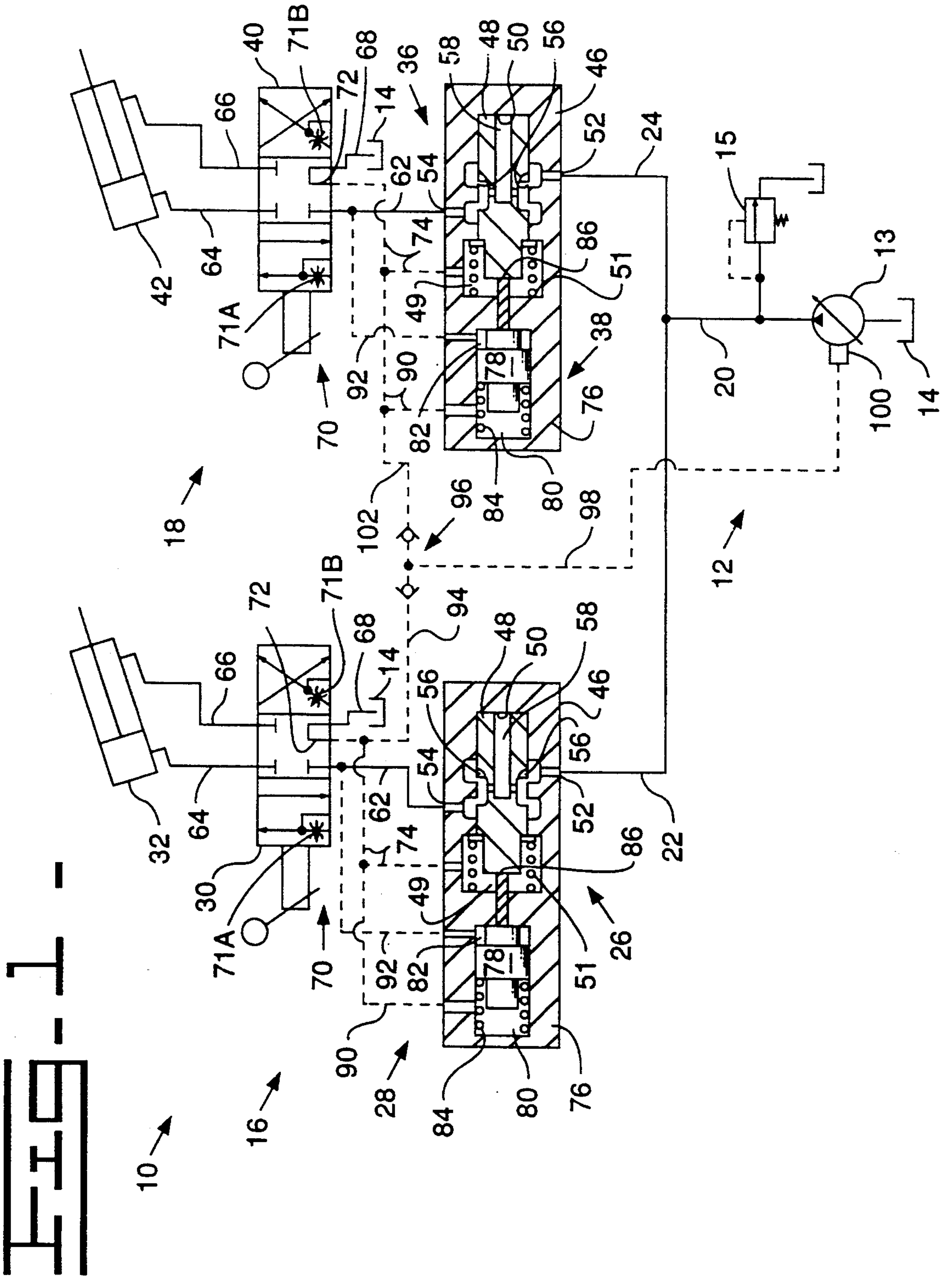
FIG. 1 is a partial diagrammatic and partial schematic representation of a fluid system incorporating an embodiment of the present invention.

Referring to the drawings and more specifically to FIG. 1, a fluid system 10 is shown and includes, a source of pressurized fluid 12, such as a flow pressure compensated pump 13 connected to a reservoir 14, a system relief valve 15 and first and second load sensing circuits 16,18. The first load sensing circuit 16 is connected to the source of pressurized fluid 12, by two conduits 20,22 while the second load sensing circuit 18 is connected to the source of pressurized fluid 12 by the conduit 20 and a conduit 24. The first load sensing circuit 16 includes a pressure compensating valve means 26 having a force balancing means 28 connected thereto, a directional control valve 30, and an actuator 32.

The second load sensing circuit 18 includes a pressure compensating valve means 36 having a force balancing means 38 connected thereto, a directional control valve 40, and an actuator 42. The first and second load sensing circuits 16,18 are substantially the same and the various elements therein are substantially the same.

The pressure compensating valve means 26 includes a positive load pressure compensating valve 46 having a valving element means 48, slidably disposed therein to define pressure chambers 49,50 at opposite ends thereof. A biasing member 50 is disposed in one pressure chamber 49 of the pressure chambers 49,50 and operable to bias the valving element means 48 in one direction. The positive load pressure compensator valve 46 has an inlet port 52 and an outlet port 54, each in operative communication with the valving element means 48. The valving element means 48 has a throttling orifice 56 disposed thereon and operative in use to control fluid flow thereacross in response to movement of the valving element means 48. A passageway 58 is defined in the valving element means 48 and operative to communicate the pressurized fluid at the outlet port 54 to the other pressure chamber 50 of the pressure chambers 49,50.

The conduit 22 from the source of pressurized fluid 12 is connected to the inlet port 52 of the positive load pressure compensated valve 46 while a pressure supply conduit 62 connects the outlet port 54 thereof with the directional control valve 30. A pair of conduits 64,66 interconnect the actuator 32 and the directional control valve 30 while an exhaust conduit 68 connects the directional control valve 30 with the reservoir 14.

The directional control valve 30 has variable orifice means 70 defined therein operative to control fluid flow thereacross. The variable orifice means 70 includes adjustable throttling orifices 71A,71B. A load pressure sensing passageway 72 is defined therein and is in selective communication with the pressure of the fluid in the actuator 32 and the reservoir 14. The load sensing passageway 72 is connected to the flow path at a location downstream of the respective adjustable throttling orifices 71A,71B. The directional control valve 30 is movable between a neutral position and first and second operative positions. In the neutral position, the pressure supply conduit 62 is blocked from communication with the conduits 64,66 and the load pressure sensing passageway 72 is connected to the reservoir 14 through the exhaust conduit 68. In the first operative position, the pressure supply conduit 62 is communicated with the conduit 64 by way of the adjustable throttling orifices 71A and the load pressure sensing passageway 72 is communicated therewith downstream of the adjustable throttling orifice 71A while the conduit 66 is connected with the exhaust conduit 68. In the second operative position, the pressure supply conduit 62 is communicated with the conduit 66 across the adjustable throttling orifice 71B and the load pressure sensing passageway 72 is communicated with the flow path downstream of the adjustable throttling orifice 71B while the conduit 64 is connected with the exhaust conduit 68. A signal conduit 74 interconnects the load pressure sensing passageway 72 with the one pressure chamber 49 of the positive load pressure compensating valve 46.

The force balancing means 28 which is connected to the pressure compensating valve means 26 can be an integral part thereof or a separate member connected thereto. In the subject illustration, the force balancing means 28 is an integral part of the positive load pressure compensating valve 46 in the form of a balancing piston assembly 76. The balancing piston assembly 76 includes a piston 78 slidably disposed therein. A pair of pressure responsive chambers 80,82 are defined therein at opposite ends of the piston 78. A biasing member 84 is disposed in one pressure responsive chamber 80 of the pressure responsive chambers 80,82 and operative to bias the piston 78 in one direction. A force transfer slug 86 is slidably disposed between the balancing piston assembly 76 and the positive load pressure compensating valve 46. The force transfer slug 86 is in operative contact with the end of the piston 78 in the other pressure responsive chamber 82 of the balancing piston assembly 76 and the end of the valving element 48 in the one pressure chamber 49 of the positive load pressure compensating valve 46. A signal conduit 90 connects the load pressure in the signal conduit 74 with the one pressure responsive chamber 80 while a signal conduit 92 connects the pressurized fluid in the pressure supply conduit 62 with the other pressure responsive chamber 82. The signal conduit 92 is connected to the pressure supply conduit 62 at a location immediately adjacent the variable orifice means 70 of the directional control valve 30. A signal conduit 94, a signal resolver 96, and a signal conduit 98 connects the load pressure signal in the load pressure sensing passageway 72 by way of conduit 74 with a flow-pressure compensated control 100 of the flow pressure compensated pump 13.

The pressure compensating valve means 36 and the force balancing means 38 of the second load sensing circuit 18 are identical to the pressure compensating valve means 26 and the force balancing means 28 of the first load sensing circuit 16. Therefore, all elements in the second load sensing circuit 18 that corresponds with those of the first load sensing circuit 16 have like element numbers. Likewise, the directional control valve 40 and the actuator 42 of the second load sensing circuit 18 are identical to the directional control valve 30 and the 10 actuator 32 of the first load sensing circuit 16. In the second load sensing circuit 18, the load signal conduit 74 is connected with the resolver 96 by a signal conduit 102 and the conduit 90. All other conduits and connections are the same as described with respect to the first load sensing circuit 16.

Figure 2:
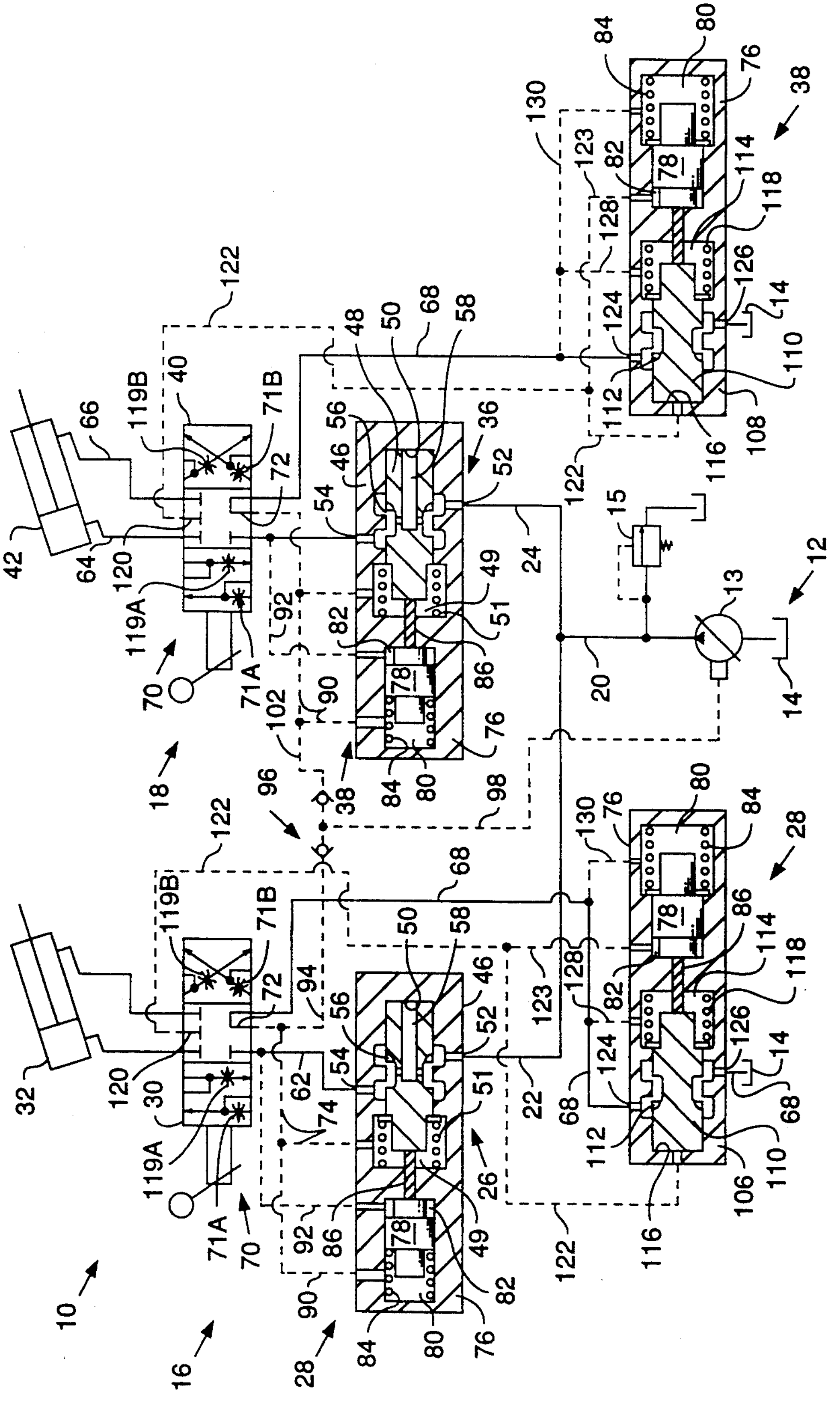
FIG. 2 is a partial diagrammatic and partial schematic representation of another embodiment of the present invention.

Referring now to FIG. 2, another embodiment of the present invention is illustrated. The fluid system 10 of FIG. 2 has many similarities to the fluid system of FIG. 1. Like FIG. 1, the fluid system 10 of FIG. 2 includes the source 12 of pressurized fluid, the reservoir 14, the system relief valve 15, and the first and second load sensing circuits 16,18. Also like FIG. 1, the fluid circuits 16,18 each contain the respective pressure compensating valve means 26,36, the force balancing means 28,38, the directional control valves 30,40 having the variable orifice means 70 defined therein with the adjustable throttling orifices 71A,71B, and the actuator 32,42. The respective pressure compensating valve means 26,36 and the force balancing means 28,38 of each of the load sensing circuits 16,18 have the positive load pressure compensating valve 46 and the balancing piston assembly 76 identical to that disclosed with respect to FIG. 1. The positive load pressure compensating valve 46 and the balancing piston assembly 76 are connected in the respective circuits 16,18 identical to that disclosed with respect to FIG. 1.

The pressure compensating valve means 26 includes a negative load pressure compensating valve 106 operatively connected in the exhaust conduit 68 of the first loads sensing circuit 16. Likewise, the load sensing circuit 18 includes a negative load pressure compensating valve 108 operatively connected in the exhaust line 68 thereof. Each of the respective negative load pressure compensating valves 106,108 has the balancing piston assemblies 76 connected thereto. The balancing piston assemblies 76 of FIG. 2 are identical to those of FIG. 1.

The negative load pressure compensating valve 106 has a valving element means 110 slidably disposed therein and has throttling orifice 112 thereon for controlling fluid flow through the exhaust conduit 68 in response to movement of the valving element means 110. A pair of pressure chambers 114,116 are defined in the negative load pressure compensated valve 106 at opposite ends of the valving element means 110. A biasing member 118 is disposed in one pressure chamber 114 of the pressure chambers 114,116 and operative to bias the valving element means 110 in one direction.

The variable orifice means 70 of the directional control valve 30 further includes adjustable exhaust throttling orifices 119A,119B disposed therein and operative to control the exhaust fluid flow from the actuator 32 to the exhaust conduit 68 in a well known manner. A negative load pressure sensing passageway 120 is operatively connected to the exhaust flow line upstream of the respective adjustable exhaust throttling orifices 119A,119B. A signal conduit 122 connects the negative load pressure sensing passageway 120 with the other pressure chamber 116 of the negative load pressure compensating valve 106. A signal conduit 123 connects the signal conduit 122 with the other pressure responsive chamber 82 of the balancing piston assembly 76. The exhaust conduit 68 is connected from the directional control valve 30 to an inlet port 124 of the negative load compensating valve 106 while a portion of the exhaust conduit 68 is connected between an outlet port 126 of the negative load pressure compensating valve 106 and the reservoir 14. A signal conduit 128 connects the exhaust conduit 68 upstream of the respective adjustable exhaust throttling orifices 119A,119B to the one pressure chamber 114 of the negative load pressure compensating valve 106. A signal conduit 130 connects the conduit 68 upstream of the respective adjustable exhaust throttling orifices 119A,119B to the one pressure responsive chamber 80 of the balancing piston assembly 76.

The negative load pressure compensating valve 108 and the balancing piston assembly 38 of the second load sensing circuit 18 are identical to the corresponding ones in the first load sensing circuit 16. Likewise, the directional control valve 40 and the actuator 42 of the second load sensing circuit 18 are identical to that of the first load sensing circuit 16.

It is recognized that various forms of the fluid system 10 could be utilized without departing from the essence of the invention. For example, the cross-sectional area of the piston 78 of the balancing piston assembly 76 could be different from the cross-sectional area of the valving element means 48 of the pressure compensating valve means 46. Likewise, the biasing force of the biasing member 84 of the balancing piston assembly 76 could be different from the spring force of the biasing member 51 of the pressure compensating valve means 26. It is also recognized that various combinations of cross-sectional areas and spring forces could be utilized without departing from the essence of the invention. Furthermore, it is recognized that the signal conduit 123 which connects the signal from the signal conduit 122 to the end of the piston 78 in the other pressure responsive chamber 82 of the balancing piston assembly 76 could be connected immediately adjacent the adjustable exhaust throttling orifices 119 in order to improve system response and to make the forced balancing means 28 respond more precisely to the differential pressure across the adjustable throttling orifices 119A,119B.

Industrial Applicability

In the operation of the fluid system 10, the flow-pressure compensated pump 13 delivers pressurized fluid from the reservoir 14 through the conduits 20,22,24, the respective pressure compensating valve means 26,36, and the conduits 62 to the respective directional control valve 30,40. With both of the directional control valves 30,40 in their neutral, flow blocking position, the flow-pressure compensated control 100 conditions the flow-pressure compensated pump 13 to reduce fluid flow output to a level sufficient to replace any fluid leakage and to maintain the standby pressure at a predetermined minimum pressure level.

With the directional control valves 30,40 in their neutral, flow blocking positions, each of the valving element means 48 of the positive load pressure compensating valves 46 moves to a flow blocking position at which communication from the inlet port 52 to the outlet port 54 is substantially blocked. The valving element means 48 achieves a balanced position at which a predetermined pressure level is maintained in the pressure supply conduit 62, as is well known in the art. The valving element means 48 moves to its flow blocking position in response to the pressurized fluid at the outlet port 54 being directed through the passageway 58 of the valving element means 48 to the 10 other pressure chamber 50. The pressurized fluid in the other pressure chamber 50 acts on the end of the valving element 48 moving it against the bias of the biasing member 51. Simultaneously therewith, the pressurized fluid in the pressure supply conduit 62 immediately adjacent the adjustable throttling orifice 71A is communicated through the signal conduit 92 to the other pressure responsive chamber 82 of the balancing piston assembly 76 and acts on the end of the piston 78 therein. The pressurized fluid acting on the end of the piston 78 moves it against the bias of the biasing member 84. Since the load pressure sensing passageway 72 is in communication with the reservoir 14 there is no pressure signal available in the signal conduits 74,90. Consequently, there is no pressure available in the one pressure chamber 49 of the positive load pressure compensating valve 46 to act against the end of the valving element means 48 or in the one pressure responsive chamber 80 to act against the end of the piston 78.

Since the second load sensing circuit 18 is substantially the same as that set forth with respect to the first load sensing circuit 16, the following operational description is directed only to the first load sensing circuit 16.

Upon movement of the directional control valve to its first operative position, fluid flow is directed across the adjustable throttling orifice 71A from the pressure supply conduit 62 to the conduit 64 and subsequently to the actuator 32 causing it to move. Exhaust flow from the actuator 32 is directed to the reservoir 14 through the conduit 66, the directional control valve 30 and the exhaust conduit 68. The flow from the pressure supply conduit 62 to the actuator 32 causes the pressure in the conduit to reduce. As a result of the reduced pressure in the pressure supply conduit 62, the pressure in the other pressure chamber 50 of the positive load pressure compensating valve 46 reduces. The valving element means 48 of the positive load pressure compensating valve 46 moves towards the position in which fluid flow from the inlet port 52 is directed across the throttling orifice 56 thereof to the outlet port 54. As the fluid flow is being directed from the flow pressure compensated pump 13 to the actuator 32, a signal representative of the load is directed therefrom through the load pressure sensing passageway 72, the conduit 94, the resolver 96, and the conduit 98 to the flow-pressure compensated control 100. The flow-pressure compensated control 100 operates in a known manner to control the rate of fluid flow and the pressure level of the fluid flow across the adjustable throttling orifices 71 to the actuator 32. The flow-pressure compensated control 100 functions to maintain a predetermined differential pressure between the flow-pressure compensated pump 13 and the actuator 32. As is well known, the constant differential pressure across the valves in the first load sensing circuit 16 maintains a predetermined flow rate thereacross and the pressure level of the flow-pressure compensated pump 13 is operating at a level as determined by the load and at a predetermined level higher than the load.

At the same time, the positive load pressure compensating valve 46 functions to maintain a differential pressure across the adjustable throttling orifice 71A at a predetermined level. The predetermined differential pressure level being maintained across the adjustable throttling orifice 71A of the directional control valve 30 is normally lower than the differential pressure being maintained from the flow-pressure compensated pump 13 to the actuator 32 across the first load sensing circuit 16. Therefore, the throttling orifice 56 of the valving element means 48 is throttling the fluid flow from the inlet port 52 to the outlet port 54 thereof and maintaining generally a pressure drop thereacross equal to the difference in the differential pressure that the flow pressure compensated control 100 is maintaining from the flow-pressure compensated pump 13 to the actuator 32 and the differential pressure that the positive load compensating valve 46 is maintaining across the adjustable throttling orifice 71A.

Since the pressure drop that is being developed across the throttling orifice 56 is small, any flow forces developed therein trying to further restrict the fluid flow is minimal. However, to the extent that there is flow forces acting on the valving element means 48, they are being offset by the flow force balancing means 28. This is accomplished by the pressure representative of the load in the actuator 32 being communicated to the end of the piston 78 in the one pressure responsive chamber 80 acting in combination with the biasing member 84 to bias the piston 78 against the opposing force created by the pressurized fluid from the pressure supply conduit 62 acting on the other end thereof in the other pressure responsive chamber 82. If the positive load pressure compensating valve 46 is controlling the differential pressure across the adjustable throttling orifice 71A at a level lower than the predetermined level as a result of flow forces, the pressurized fluid in the pressure supply conduit 62 would be below the desired amount. Consequently, the force acting on the end of the piston 78 in the other pressure responsive chamber 82 would be likewise smaller, thus, upsetting the balance of the forces acting on the piston 78. The higher force acting on the piston 78 by the combined force of the biasing member 84 and the load pressure acting on the end of the piston 78 in the one pressure responsive chamber 80 moves the piston 78 in a direction against the force transfer slug 86. A force equal to the unbalanced force is directly applied through the load transfer slug 86 to the end of the valving element means 48. This force acts to move the valving element means 48 to a position at which the throttling orifice 56 are larger. As the valving element means 48 moves to a position at which the throttling orifice 56 are larger as a result of the force acting thereon from the force transfer slug 86, the pressure level in the conduit 62 is increased. This increased pressure is simultaneously transferred to the other pressure responsive chamber 82 to again establish a balanced condition in the force balancing means 28. The force tending to close the throttling orifice 56 of the valving element means 48 is thus offset and the predetermined differential pressure across the adjustable throttling orifice 71A is maintained at its predetermined level.

If the second load sensing circuit 18 is operated at the same time as the first load sensing circuit 16, the difference in pressure across the respective positive load pressure compensating valves 46 can vary drastically. For example, assume that it is desirable to have the same predetermined differential pressure across the adjustable throttling orifices 71 of each of the directional control valves 30,40, but that the actuator 32 of the first load sensing circuit 16 has a small load and the actuator 42 of the second load sensing circuit 18 has a load that requires twice the amount of force to move. In this situation, the load signal from the second load sensing circuit 18 to the flow-pressure compensated control 100 functions to condition the flow-pressure compensated pump 13 to provide the necessary flow at the desired pressure level to move the heavily loaded actuator 42 at the predetermined rate of movement by maintaining the differential pressure from the flow-pressure compensated pump 13 to the actuator 42 across the second load sensing circuit 18. At the same time, as previously discussed with respect to the first load sensing circuit 16, the positive load pressure compensated valve 46 of the second load sensing circuit 18 functions to throttle the fluid flow thereacross to maintain the pressure drop thereacross equivalent to the difference in the differential pressure being maintained between the flow-pressure compensated pump 13 and the load pressure in the actuator 42 and that of the differential pressure being maintained across the adjustable throttling orifice 71A as controlled by the positive load pressure compensated valve 36.

Since the actuator 32 of the first load sensing circuit 16 is not heavily loaded, its load signal in the signal conduit 94 has no affect on the flow-pressure compensated control 100 since it is lower than the pressure signal in the conduit 102. However, the load pressure due to the load on the actuator 32 is still being directed through the load pressure sensing passageway 72 of the directional control valve 30 to the one pressure chamber 49 of the positive load pressure compensated valve 46 and also through the signal conduit 90 to the one pressure responsive chamber 80 of the force balancing means 28. Furthermore, since the actuator 32 is lightly loaded, the flow from the flow-pressure compensated pump 13 tends to flow to the actuator 32 having the lightest load. However, in this instance the added flow trying to cross the adjustable throttling orifice 71A of the first load sensing circuit 16 results in an increase in pressure in the pressure supply conduit 62. This increase in fluid pressure in the pressure supply conduit 62 is directed through the passageway 58 within the valving element means 48 to the other pressure chamber 50 therein thus acting on the end of the valving element means 48 tending to move it towards the flow blocking position. The movement of the valving element means 48 is opposed by the collective forces of the biasing member 51 and the pressurized fluid in the one pressure chamber 49 acting on the other end thereof. The valving element means 48 achieves a balanced position at which the differential pressure acting across the adjustable throttling orifice 71A is maintained at the predetermined pressure level.

In this particular situation, the pressure level of the fluid in the pressure supply conduit 62 of the first load sensing circuit 16 is substantially less than the pressure level in the conduit 22 upstream of the positive load pressure compensating means 46. Since the load on the actuator 32 is half of the load on the actuator 42, the pressure level in the pressure supply conduit 62 of the first load sensing circuit 16 downstream of the positive load pressure compensating valve 46 is approximately half of the pressure level of the fluid in the conduit 22 upstream of the positive load pressure compensating control valve 46. Therefore, the pressure drop across the throttling orifice 56 thereof is high. Since, as is well known, the flow forces acting on a valve is directly proportional to the pressure drop thereacross, the force representative of the flow forces acting to close the throttling orifice 56 of the valving element means 48 is high. If the force trying to close the throttling orifice 56 is not counteracted, the differential pressure across the adjustable throttling orifice 71A will be operating at a level lower than that desired. The force balancing means 28 functions to sense the lowering of the differential pressure across the directional control valve 30 and provide a counteracting force to the valving element means 48 returning it to the position at which the predetermined differential pressure across the adjustable throttling orifice 71A is once again maintained.

Since any forces resulting from flow forces acting to close the valving element means 48 results in the pressure level of the fluid in pressure supply conduit 62 being lowered, the lower pressure level therein is sensed by the force balancing means 28 and results in the balancing piston assembly 76 thereof becoming unbalanced. Since the balancing piston assembly 76 operates in a balanced mode only when the predetermined differential pressure across the adjustable throttling orifice 71A is maintained, the force equivalent to the degree of unbalance is transmitted through the force transfer slug 86 to the valving element means 48 in opposition to the force created by flow forces tending to close the valving element means 48. As the valving element means 48 moves to increase the opening of the throttling orifice 56, the pressure level in the pressure supply conduit 62 once again increases and the increase in pressure in the pressure supply conduit 62 is directed through the conduit 92 to act on the end of the piston 78 in the other pressure responsive chamber 82 to once again place the piston 78 in its balanced condition. This balanced condition, as noted above, is representative of the differential pressure acting across the adjustable throttling orifice 71A. Therefore, in the subject arrangement, any flow forces attempting to reduce the fluid flow across the throttling orifice 56 is quickly sensed and offset by the balancing piston assembly 76.

By having the signal conduit 92 connected to the pressure in the pressure supply conduit 62 immediately adjacent the variable orifice means 70, the effects of the frictional losses in the pressure supply conduit 62 can be offset thus improving the response time of the respective load sensing circuits 16,18. The response is likewise improved by increasing the velocity of the fluid flow being delivered from the pressure compensating means 26 to the directional control valve 30. This may be accomplished by reducing the size of the pressure supply conduit 62 therebetween. The objective is to decrease the volume of fluid in the pressure supply conduit 62 while increasing the velocity of the fluid. This volume of fluid is one of the most critical parameters effecting system response time while not affecting the predetermined differential pressure across the variable orifice means 70.

Referring to FIG. 2, the operation of this fluid system 10 is identical to the operation of the fluid system 10 of FIG. 1 when the system is handling the positive load. In the event, that the fluid system 10 of FIG. 2 is handling a negative load, the negative load pressure compensating valves 106,108 function to control the fluid flow across the respective adjustable exhaust throttling orifices 119A,119B of the respective directional control valves 30,40 at a predetermined differential pressure level.

The operation of the negative load pressure compensating valve 106,108 is well known. In general, the return flow from the respective actuators 32,42 is directed across the respective adjustable exhaust throttling orifices 119A,119B, through the exhaust conduit 68, and through the negative load pressure compensating valve 106,108 to the reservoir 14. The valving element means 110 of the respective negative load pressure compensating valves 106,108 has the throttling orifice 112 to control the fluid flow thereacross in response to movement of the valving element means 110. The valving element means 110 moves to a fluid flow blocking position against the bias of the biasing member 118 in response to a negative load pressure signal received through the signal conduit 122 and the negative load pressure sensing passageway 120 that is connected to the exhaust flow upstream of the adjustable exhaust throttling orifices 119A,119B. The pressure downstream of the adjustable exhaust throttling orifices 119A,119B is connected through the signal conduit 128 to the one pressure chamber 114 and acts in cooperation with the biasing member 118 to control the fluid flow across the throttling orifice 112 to maintain the predetermined differential pressure across the respective adjustable exhaust throttling orifices 119A,119B.

As previously noted with respect to the balancing piston assembly 76 connected to the positive load pressure compensator 46 of FIG. 1, the balancing piston assembly 76 is likewise connected to the negative load pressure compensating valve 106 and functions in the same manner to counteract any flow forces that tends to close the valving element means 110. The piston 78 of the subject balancing piston assembly 76 is maintained in a balanced condition by the pressurized fluid upstream of the respective adjustable exhaust throttling orifices 119A,119B being communicated to the other pressure responsive chamber 82 to act on the end of the piston 78 while the pressurized fluid downstream of the respective adjustable exhaust throttling orifices 119A,119B is communicated through the signal conduit 130 to the one pressure responsive surface 80 to act on the other end of the piston 78 in cooperation with the biasing member 84. The piston 78 is maintained and balanced as long as the predetermined differential pressure across the appropriate one of the adjustable exhaust throttling orifices 119A,119B is maintained at the predetermined differential pressure level. If the pressure level in the exhaust conduit 68 upstream of the throttling orifice 112 of the valving element means 110 increases due to flow forces tending to close the throttling orifice 112, the resulting increased pressure is directed against the end of the piston 78 in the one pressure responsive chamber 80 causing an unbalance in forces acting on the piston 78. The magnitude of the unbalanced force is transferred through the force transfer slug 86 to one end of the valving element means 110 to counteract the flow forces tending to close the throttling orifice 112. As previously noted with respect to FIG. 1, the magnitude of force created by flow across the throttling orifice 112 increases as the pressure drop across the throttling orifice 112 increases. Consequently, the higher the flow forces tending to close the valving element means 110, the greater the increase in pressure in the conduit 68 and likewise in the one pressure responsive chamber 80. The force of the fluid pressure acting on the end of the piston 78 is transferred through the load transfer slug 86 to the end of the valving element means 110 to offset the forces caused by the flow forces acting to close the throttling orifice 112.

In view of the foregoing, it is readily apparent that the fluid system 10 of the present invention provides flow force compensation to the pressure compensating valve means 26,36 that is directly proportional to the differential pressure acting across the variable orifice means 70 of the directional control valves 30,40. This compensation of the flow forces maintains the predetermined differential pressure across the directional control valves 30,40 regardless of major differences in the magnitude of the loads between the various circuits in the system.

Other aspects, objects and advantages of the invention can be obtained from a study of the drawings, the disclosure and the appended claims.

I claim:

1. Flow force compensating means for use in a fluid system having a source of pressurized fluid connected to a reservoir, an actuator driven by fluid flow from the source of pressurized fluid, a directional control valve having variable orifice means disposed therein, and pressure compensating valve means having valving element means with a throttling orifice defined thereon and being operative to control a differential pressure across the variable orifice means of the directional control valve at a substantially constant level by controlling the flow across the pressure compensating valve means, the flow force compensating means comprising:

force balancing means responsive only to the differential pressure across the variable orifice means of the directional control valve for generating and transmitting a balancing force to the valving element means of the pressure compensating valve means to offset the flow forces acting on the valving element means thereof.

2. Flow force compensating means for use in a fluid system having a source of pressurized fluid connected to a reservoir, an actuator driven by fluid flow from the source of pressurized fluid, a directional control valve having variable orifice means disposed therein, and pressure compensating valve means having valving element means with a throttling orifice defined thereon and being operative to control a differential pressure across the variable orifice means of the directional control valve at a substantially constant level by controlling the flow across the pressure compensating valve means, the flow force compensating means comprising:

force balancing means responsive only to the differential pressure across the variable orifice means of the directional control valve for generating and transmitting a balancing force to the valving element means of the pressure compensating valve means to offset the flow forces acting on the valving element means thereof, the force balancing means is operatively connected to the pressure supply conduit and includes a balancing piston assembly having a piston slidably disposed therein to define pressure responsive chambers at opposite ends thereof, a biasing member in contact with the end of the piston in the one pressure responsive chamber, and a force transfer slug disposed between the end of the piston in the other pressure responsive chamber and the valving element means of the pressure compensating valve means.

3. The flow force compensating means of claim 2 wherein the end of the piston in the one pressure responsive chamber is operatively connected with the pressurized fluid from the source of pressurized fluid at a location downstream of the variable orifice means of the directional control valve and the end of the piston in the other pressure responsive chamber is operatively connected to the pressurized fluid from the source of pressurized fluid upstream of the variable orifice means of the directional control valve.

4. The flow force compensating means of claim 3 wherein the valving element means of the pressure compensated valve means has a predetermined effective cross sectional area and the piston of the force balancing means has a predetermined effective cross-sectional area that is substantially equal to the cross sectional area of the valving element means of the pressure compensated valve means.

5. The flow force compensating means of claim 4 wherein the pressure compensated valve means has a biasing member with a predetermined effective force in contact with the valving element means therein and the biasing member of the force balancing means has a predetermined effective force substantially equal to the force of the biasing member in the pressure compensated valve means.

6. The flow force compensating means of claim 5 wherein the variable orifice means in the directional control valve includes an adjustable throttling orifice located between the source of pressurized fluid and the actuator, the pressure compensated valve means includes a positive load pressure compensated valve having the balancing piston assembly connected thereto and which is located between the source of pressurized fluid and the directional control valve, a pressure supply conduit connects the pressure compensating valve means with the directional control valve and the end of the piston in the other pressure responsive chamber is operatively connected to the pressure supply conduit at a location immediately adjacent the adjustable throttling orifice of the directional control valve.

7. The flow force compensating means of claim 5 wherein the variable orifice means in the directional control valve includes an adjustable exhaust throttling orifice located between the actuator and the reservoir, and the pressure compensated valve means includes a negative load pressure compensated valve having another balancing piston assembly connected thereto and which is located between the adjustable exhaust throttling orifice and the reservoir.

8. The flow force compensating means of claim 5 wherein the variable orifice means of the directional control valve includes an adjustable throttling orifice located between the source of pressurized fluid and the actuator and an adjustable exhaust throttling orifice located between the actuator and the reservoir, the pressure compensating valve means with the force balancing means connected thereto includes a positive load pressure compensating valve with the balancing piston assembly connected thereto is located between the source of pressurized fluid and the directional control valve and a negative load pressure compensated valve means with the balancing piston assembly connected thereto is located between the directional control valve and the reservoir.

* * * * *